July 20, 1965 D. W. SEYMOUR 3,196,032
PROCESS FOR PRODUCING ELECTROSTATIC INK POWDER
Filed Feb. 20, 1962

*INVENTOR.*
DAVID W. SEYMOUR
BY *Carl Fissell Jr.*
AGENT

United States Patent Office 3,196,032
Patented July 20, 1965

3,196,032
PROCESS FOR PRODUCING ELECTROSTATIC INK POWDER
David W. Seymour, King of Prussia, Pa., assignor to Burroughs Corporation, Detroit, Mich., a corporation of Michigan
Filed Feb. 20, 1962, Ser. No. 174,460
1 Claim. (Cl. 117—16)

This invention relates to a process for coating dry particulate materials and more particularly, to a method of coating one powder material with another powder material while maintaining the powder properties of both materials. With still more particularity, the invention has to do with the utilization of a fluid bed reactor for applying one type of a powder particle to another type of powder particle in a manner wherein the particles of one powder are partially embedded in the particles of the other powder. Still more particularly, the invention has to do with a process employing a fluid bed reactor wherein a first powder e.g., thermoplastic resin is coated with a second powder e.g., a carbonaceous material in a suitable atmosphere thereby to form an opaque powder useful as a marking or printing ink.

It is an object therefore of the present invention to provide a novel method for coating one dry powder with another dry powder.

Another object of the invention is to provide a process for coating a dry powder with another, different and colored dry powder thereby forming an opaque powder material.

Another object of the invention is to provide a method of producing a dry powder type electrostatic ink wherein particles of varying sizes are mixed in a fluid bed reactor such that particles of a first varying range of sizes are coated with other and different particles.

In accordance with the foregoing objects and first briefly described herein, the present invention is directed to a method wherein a fluid bed reactor is employed with a powder mixture including at least two groups of powder particles of differing desired sizes in which the powder particles of one group are partially embedded in the surface of the particles of the other group of powder particles by introducing through the fluid bed a suitable solvent chemically inert with respect to one group of powder particles and chemically active with respect to the powder particles of the other group so that the one group of particles become slightly tacky causing the powder particles of the other group to adhere thereto and wherein the two groups of powder particles chemically and physically bond together thereby forming as an end product a dry powder of the type which may be used for example, as an electrostatic printing ink.

The manner in which the foregoing and other objects of the invention may best be achieved, will be fully understood from a consideration of the following detailed description taken together with the accompanying drawings, in which.

Although the following detailed description of the powder particle coating process is directed to the formation of electrostatic printing inks it is to be understood that the process itself is not so limited inasmuch as the teaching herein disclosed is applicable to the coating of particles of one dry powder with the particles of another dry powder in a suitable atmosphere. The method thus may find use in other industries than electrostatic printing, as for example, drugs, paint, etc.

Figure 1:
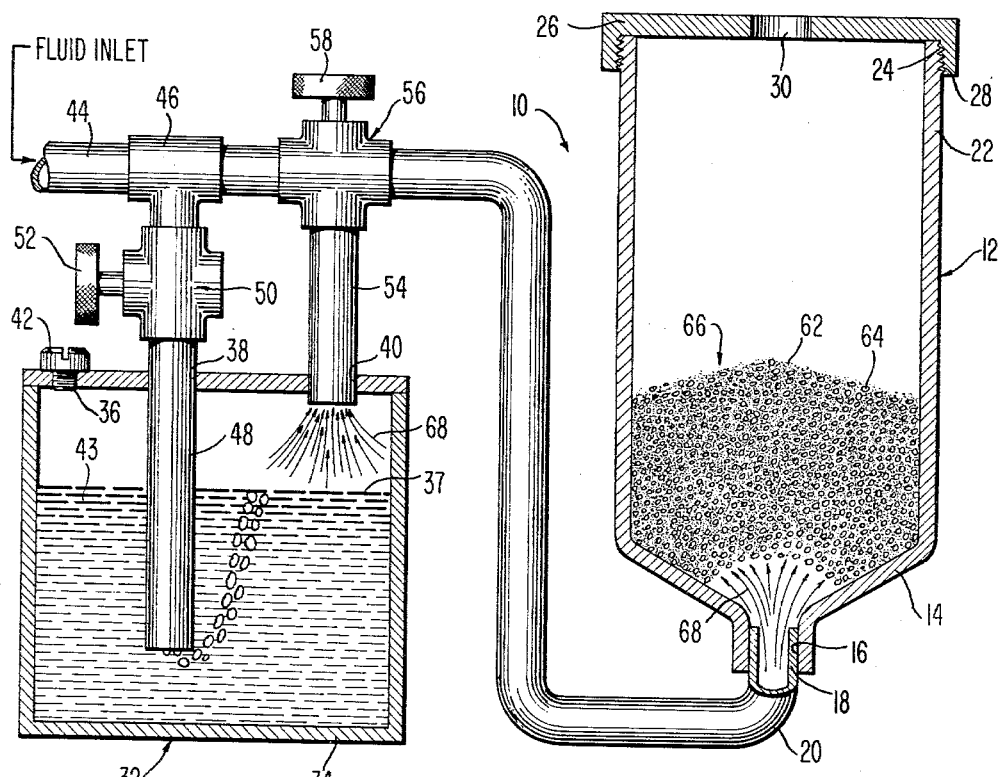
FIG. 1 is a diagrammatic view of a fluid bed reactor employing the present invention.

In the preferred and illustrated embodiment of FIG. 1 a fluid bed reactor 10 is seen to include a cylindrical tank or container 12, having a tapered funnel-shaped bottom portion 14 terminating in a short pipe-like aperture 16. The cylindrically-shaped projecting portion 18 of a bent pipe or conduit 20, for purposes to be explained herein presently, is adapted to be press-fitted or otherwise secured relatively tightly in the aperture 16. The upper portion 22 of the container 12 may be externally threaded as at 24. A cover 26 provided with an internally threaded counterbore 28 and having a vent or aperture 30 therein is adapted to threadedly engage threads 24 securing the cover to the container 12.

A solvent bubbler 32, for purposes still to be explained, is seen to include a rigid tank or vessel 34 of metal, plastic or other suitable material, having a plurality of apertures, 36, 38 and 40 in the upper portion thereof. The fluid inlet aperture 36 is threaded. A cap or screw 42 is threadedly engaged in aperture 36. A solvent fluid 43 may thus be conveniently introduced through the opening 36 and brought to a desired level 37 in the vessel 34. An air inlet pipe 44 from a source of air or inert gas under suitable pressure (not shown) is connected by means of the T joint or connector 46 to an air inlet pipe section 48 extending into the tank 34 through aperture 38, by way of a control valve 50. Fluid flow through valve 50 is controlled by means of the knurled wheel 52 in a known manner. An outlet pipe 54 extends into vessel 34 through opening 40. A mixing valve 56 controlled by the knurled wheel 58 interconnects the air line between T joint 46 and outlet pipe 54. Conduit 20 connects valve 56 with container 12.

In operation of the apparatus according to the novel method herein disclosed quantities of two groups of dry powders e.g., carbon particles 62 of a desired size and a thermoplastic powder 64 are dry mixed together in a prestaging operation. Thereafter, this premixed material 66 is deposited in the container 12 of the fluid bed reactor 10.

With valve 50 closed, valve 56 is opened so that a sufficient volume of dry air or inert gas is admitted into chamber 12 through conduit 20 to cause the particle mixture 66 to become turbulent and to further mix together while suspended in a fluid moving mass in which contacts between particles are relatively uncommon. And, since the air or gas velocity into and through chamber 12 is sufficient to suspend the particles the latter tend to concentrate more or less in one area as shown, although constantly moving.

Once the reactor 10 has been fluidized, and the dry particle mass is suspended above the inlet opening 18, valve 50 is opened to permit air to enter the bubbler tank 34 causing the solvent 43 to be vaporized. The solvent vapor 68 is thereupon forced by the pressure of the entering air through the outlet pipe 54 through valve 56 into the fluid stream of air or inert gas and into the conduit 20. From this point the vapor penetrates into and mixes with the now suspended mass 66.

The powder materials utilized herein are chosen from among groups of materials certain of which are chemically soluble in suitably chosen solvents and certain others of which are chemically inert or inactive in such solvents. One of the groups of materials employed in the present invention is the thermoplastic resins, such for example, as B-stage (incompletely cured), phenol-formaldehyde (phenolic spray dried microspheroidal powder) for which isopropanol (isopropyl alcohol) is a good solvent. Another example is powdered polyvinyl acetate, a material sold under the trade name "Geon 202" and manufactured by the B. F. Goodrich Co., for which a good solvent is acetone.

The other group of materials used herein is carbon in the form for example, of powdered lampblack, chimney black or channel black which is inert, inactive and/or insoluble in the solvents aforementioned. The preferred embodiment of the invention contemplates coating thermoplastic resinous material 64 running in particle size from approximately 25 to 50 microns with carbonaceous material the particle size of which is on the order of from 8 to 25 millicrons.

Figure 2:
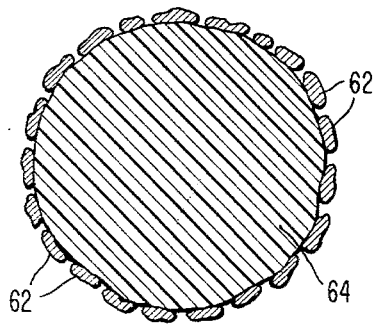
FIG. 2 is a greatly enlarged cross-sectional view of a particle before the process is completed.
Figure 3:
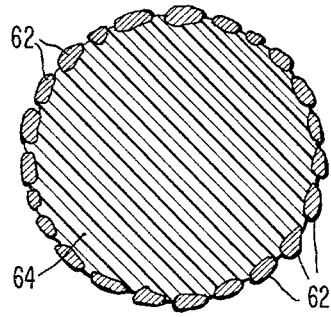
FIG. 3 is a greatly enlarged view similar to FIG. 2 showing the particle after the coating process is terminated.

Returning now to the operational description, the vaporous mixture 68 of air and solvent forced through the fluidized bed 66 attacks the thermoplastic material 64 causing it to soften and become slightly tacky in consistency and, as shown in FIG. 2, readily permits the smaller carbon particles 62 to adhere thereto. After a sufficient time the solvent is driven off and the carbon particles embed themselves in the surface portion of the resinous particles as shown in FIG. 3. The two powders thus become bonded together. Thereafter the fluidizing mass 66 is air dried as by closing valve 50 and continuing to vent air or gas therethrough. The fluid reactor keeps the particles separated thus preventing the formation of aggregates. Also, the insoluble powder i.e., carbon, acts as a parting agent should coated particles collide during processing. In this manner a dry powder product is produced. In the preferred embodiment this novel method results in an opaque powder having an excellent rich, black color and desirable resisitivity for good electrostatic printing. A small amount of a fine dust which might be carried to the top of the chamber 12 by the air column will be vented through the air outlet opening 30 in the lid of the container.

By virtue of the press-fitted relationship between the container 12 and the conduit portion 18 of the container may be removed to permit the decanting of the coated dry powder or conversely the coated dry powder may be scooped out of the container after the "bed" has been deactivated or shut-down.

In a typical example utilizing the disclosed method to produce a dry, black electrostatic printing ink having the desired degree of electrical conductivity and color the following formulation gave excellent results.

One gram by weight of powder lampblack was added to 10 grams by weight of polyvinyl acetate powder, dry mixed and placed in the reactor 10. After reacting approximately three minutes according to the hereinabove described method the powder product was removed from the reactor. Resistance measurements made on the power indicated an effective resistance of 20,000 ohms, a sufficiently high resistance for good electrostatic printing.

As applied to the particular case of producing an electrostatic ink, it is seen from the foregoing that carbon can be coated on various resin powders with the immediate advantage that a relatively small amount of carbon is required to obtain sufficient conductivity and black color saturation. The method is fast, and a single reactor can be used for the mixing, reacting and drying stages. The thermoplastic characteristic of the chosen resin is preserved since only the surface is carbon-loaded. The electrical resistance can be measured while the reaction is in progress, and the resistance measurement can be used as a control of the reaction. Various resistances can be obtained from a single formulation by varying the reaction time accordingly. With suitably and properly chosen proportions of powders and reaction time, the carbon will be completely absorbed by the resin surface, resulting in an ink with no fine carbon particles, producing virtually no smearing, of print. An additional important advantage of the present method is that if the two powders chosen for use are widely different in size, the excess or "unreacted" fine particles can be removed easily by means of a relatively inefficient classifier, elutriator or winnower. In the preferred and illustrated embodiment of the present method the solvent is introduced into the reactor by means of a "bubbler." However, sprays could be used for this operation. Or, the solvent could be vaporized by boiling. Temperature control of the bubbler, sprayer or vaporizer thus can be used as another means to control the quality of the end product.

While the present invention is extremely useful in the coating of thermoplastic resin powders with powdered carbon using solvents such as isopropyl alcohol or acetone, the process and method is not limited to these materials and has been used effectively with other and different materials. The present method is particularly useful for intentionally forming aggregates and/or elutriating fines i.e., the smallest particles, as for example, where it is desirable to coat one type of powder material with particles of a similar powder material thus to form larger size powder particles.

What is claimed is:

The method of manufacturing electrostatic printing ing comprising the steps of:

(a) dry mixing ten grams by weight of polyvinyl acetate resin powder material of a particle size of from 25 to 50 microns with one gram by weight of inert lamp-black material of a particle size of from 8 to 25 millicrons, the latter having an opaque dense black consistency, (b) introducing the mixture into a fluid bed reactor, (c) passing pressurized dry air upwardly through said mitxure to form a dense phased fluidized mass, (d) passing an acetone vapor in which the resin is soluble through said dense fluidized mass whereby said resin powder is slightly softened and made relatively tacky so that particles of said lamp-black powder become partially imbedded in and bonded to the surfaces of said resin material, and (e) air drying said fluidized mass with pressurized air without the solvent to a powder consistency.

References Cited by the Examiner

UNITED STATES PATENTS

| | | | |
|---|---|---|---|
| 2,638,416 | 5/53 | Walkup | 252—62.1 |
| 2,683,669 | 7/54 | Coler | 117—100 |
| 2,729,597 | 1/56 | Garbo. | |
| 2,788,297 | 4/57 | Louis | 117—100 |
| 2,879,173 | 3/59 | Yacoe | 117—100 |
| 2,999,764 | 9/61 | Rhoads | 117—47 |
| 3,008,826 | 11/61 | Mott et al. | |
| 3,036,338 | 5/62 | Nack. | |

WILLIAM D. MARTIN, *Primary Examiner.*

J. GREENWALD, *Examiner.*